United States Patent
Oh et al.

(10) Patent No.: US 12,522,044 B2
(45) Date of Patent: Jan. 13, 2026

(54) THERMAL MANAGEMENT SYSTEM FOR VEHICLE

(71) Applicants: Hyundai Motor Company, Seoul (KR); Kia Corporation, Seoul (KR)

(72) Inventors: Man Ju Oh, Yongin-si (KR); Uk Il Yang, Yongin-si (KR); Ki Mok Kim, Busan (KR); Sang Shin Lee, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 272 days.

(21) Appl. No.: 18/179,898

(22) Filed: Mar. 7, 2023

(65) Prior Publication Data

US 2024/0109393 A1     Apr. 4, 2024

(30) Foreign Application Priority Data

Oct. 4, 2022   (KR) ................. 10-2022-0126356

(51) Int. Cl.
*B60H 1/00*     (2006.01)
*B60H 1/22*     (2006.01)

(52) U.S. Cl.
CPC ..... *B60H 1/00278* (2013.01); *B60H 1/00885* (2013.01); *B60H 1/2215* (2013.01);
(Continued)

(58) Field of Classification Search
CPC ............ B60H 1/00278; B60H 1/00885; B60H 1/00921; B60H 1/2215; B60H 1/32284;
(Continued)

(56) References Cited

U.S. PATENT DOCUMENTS 9,758,010 B2   9/2017   Johnston
10,946,713 B2   3/2021   Seki et al.
(Continued)

FOREIGN PATENT DOCUMENTS

EP           2258571 B1     4/2016
JP        2015191703 A    11/2015
(Continued)

*Primary Examiner* — Henry T Crenshaw
(74) *Attorney, Agent, or Firm* — SLATER MATSIL, LLP (57) ABSTRACT

An embodiment is a thermal management system for a vehicle, the thermal management system including a main refrigerant line in which a compressor, an indoor condenser, a first expansion valve, an outdoor condenser, a second expansion valve, and an indoor evaporator are sequentially provided, a battery cooling water line in which a battery, the chiller for a battery, and a water pump for a battery are sequentially provided, a refrigerant heater disposed between the compressor and the indoor condenser on the main refrigerant line, and a controller configured to control operations of the compressor and the refrigerant heater, control opening and closing of the first expansion valve and the second expansion valve, control operations of the water pump for an electric component and the water pump for a battery, and control flow paths of the refrigerant, the cooling water for an electric component, and the cooling water for a battery.

17 Claims, 8 Drawing Sheets

(52) U.S. Cl.
CPC .............. *B60H 2001/00928* (2013.01); *B60H 2001/00949* (2013.01)

(58) Field of Classification Search
CPC ........... B60H 2001/00307; B60H 2001/00928; B60H 2001/00949
See application file for complete search history.

(56) References Cited

U.S. PATENT DOCUMENTS

| | | | |
|---|---|---|---|
| 2013/0139528 A1* | 6/2013 | Katayama | B60H 1/00921 62/81 |
| 2017/0361677 A1* | 12/2017 | Kim | H01M 10/663 |
| 2018/0117985 A1* | 5/2018 | Kim | B60H 3/024 |
| 2018/0117986 A1* | 5/2018 | Kim | B60H 1/00278 |

FOREIGN PATENT DOCUMENTS

| | | |
|---|---|---|
| KR | 20200038608 A | 4/2020 |
| KR | 20210037140 A | 4/2021 |
| KR | 20210047733 A | 4/2021 |

\* cited by examiner

THERMAL MANAGEMENT SYSTEM FOR VEHICLE

CROSS-REFERENCE TO RELATED APPLICATIONS

The present application claims priority of Korean Patent Application No. 10-2022-0126356 filed on Oct. 4, 2022, the application which is incorporated herein in its entirety.

TECHNICAL FIELD

The present disclosure relates to a thermal management system for a vehicle.

BACKGROUND

Recently, due to environmental issues of internal combustion engine vehicles, electric vehicles and the like have been widely used as eco-friendly vehicles. However, the existing internal combustion engine vehicle can heat an interior of a vehicle using waste heat of an engine and thus does not need separate energy for heating. However, the eco-friendly vehicle such as an electric vehicle has no heat source such as an engine and thus needs to perform heating through separate energy, which causes a problem in which fuel efficiency is degraded.

In addition, it is true that an issue such as degradation in fuel efficiency in the electric vehicle becomes a cause of shortening an available mileage of the electric vehicle, which causes inconvenience such as the need for frequent charging.

Therefore, a heat pump system, which is different from an air conditioner of an internal combustion engine vehicle, is applied to an air conditioner of an eco-friendly vehicle such as an electric vehicle.

Generally, the heat pump system is a cooling and heating device for transferring a low-temperature heat source to a high temperature or transferring a high-temperature heat source to a low temperature using heating or condensation heat of a refrigerant, and the heat pump system is a cooling and heating system for absorbing heat from an exterior during heating to emit the absorbed heat to the interior and for emitting heat of the interior to the exterior during cooling.

However, thermal management needs for electric components such as batteries and motors as well as air conditioners are newly added to eco-friendly vehicles such as electric vehicles.

That is, in the eco-friendly vehicles such as electric vehicles, the needs for air conditioning are different for an indoor space, the battery, and the electric component, and there is a need for a technology capable of independently responding to and effectively collaborating the indoor space, the battery, and the electric component to save energy as much as possible. Accordingly, an integrated thermal management concept of a vehicle has been proposed to increase thermal efficiency by integrating entire thermal management of the vehicle while independently performing thermal management for each component.

In order to perform the integrated thermal management of a vehicle, it is necessary to integrate and modularize complicated cooling water lines, refrigerant lines, and parts. It is necessary to modularize and simply manufacture a plurality of parts, and to achieve a concept of compact modularization in terms of packaging.

Meanwhile, in the integrated thermal management system of the vehicle to which the heat pump system is applied, in preparation for a case in which the heat pump system does not operate smoothly, such as when a temperature of outdoor air is low, various types of heaters including a water heating heater provided in a cooling water line to increase a battery temperature, and an air heating heater provided in a refrigerant line for heating an interior are separately provided and applied to the integrated thermal management system of the vehicle.

However, the separate provision of the water heating heater for increasing the battery temperature and the air heating heater for heating the interior is not efficient in terms of thermal management, and the number of parts is also increased. Therefore, research for reducing the number of parts while improving the integrated thermal management system is recently ongoing.

The foregoing is intended merely to aid in the understanding of the background of the present disclosure, and is not intended to mean that the present disclosure falls within the purview of the related art that is already known to those skilled in the art.

SUMMARY

The present disclosure relates to a thermal management system for a vehicle, and more particularly, a thermal management system for a vehicle, which is capable of reducing the number of parts by installing a heater for heating a refrigerant at a downstream point of a compressor and is capable of implementing various heating modes by replacing a water heating heater for a battery temperature increase and a positive temperature coefficient (PTC) heater for indoor heating.

Accordingly, the present disclosure has been made keeping in mind the above problems occurring in the related art, and the present disclosure is intended to propose a thermal management system for a vehicle, which is capable of reducing the number of parts by installing a heater for heating a refrigerant at a downstream point of a compressor and is capable of implementing various heating modes by replacing a water heating heater for a battery temperature increase and a positive temperature coefficient (PTC) heater for indoor heating.

It should be noted that objects of the present disclosure are not limited to the above-described objects, and other objects of the present disclosure will be apparent to those skilled in the art from the following descriptions.

According to one aspect of the present disclosure, there is provided a thermal management system for a vehicle, the thermal management system including: a main refrigerant line in which a compressor, an indoor condenser, a first expansion valve, an outdoor condenser, a second expansion valve, and an indoor evaporator are sequentially provided and through which a refrigerant for air conditioning is circulated and thus heat exchange is performed; a branch refrigerant line which branches from a downstream point of the indoor condenser, passes through a chiller for a battery and a chiller for an electric component, and then is introduced into the compressor; a battery cooling water line in which a battery, the chiller for a battery, and a water pump for a battery are sequentially provided and which is connected such that cooling water for a battery is circulated and absorbs heat while being selectively heat-exchanged with a refrigerant flowing from the chiller for a battery to the branch refrigerant line; an electric component cooling water line in which an electric component, the chiller for an electric component, and a water pump for an electric component are sequentially provided and which is connected such that cooling water for an electric component is circulated and radiates heat while being selectively heat-exchanged with the refrigerant flowing from the chiller for an electric component to the branch refrigerant line; a refrigerant heater disposed between the compressor and the indoor condenser on the main refrigerant line and configured to selectively heat the refrigerant; and a controller configured to control operations of the compressor and the refrigerant heater, control opening and closing of the first expansion valve and the second expansion valve and opening degrees thereof, control operations of the water pump for an electric component and the water pump for a battery, and control flow paths of the refrigerant, the cooling water for an electric component, and the cooling water for a battery.

In the branch refrigerant line, a third expansion valve may be provided at an upstream point of the chiller for a battery, and a fourth expansion valve may be provided at an upstream point of the chiller for an electric component. The controller may control opening and closing of the third expansion valve and the fourth expansion valve and opening degrees thereof.

A positive temperature coefficient (PTC) heater configured to perform indoor heating may not be disposed on the main refrigerant line, and a water heating heater configured to increase a temperature of the battery may not be disposed on the battery cooling water line.

The refrigerant heater may be integrally provided at a rear end of the compressor.

The refrigerant heater may be separately provided from the compressor at a downstream point of the compressor, and the compressor and the refrigerant heater may be connected to a flow path member for high temperature and high pressure so that a high-temperature and high-pressure refrigerant may flow, and an outer side of the flow path member may be covered by an insulating member.

The flow path member may be a pipe or a hose, and the insulating member may be resin foam.

The refrigerant heater may be integrally provided at a front end of the indoor condenser.

In a first heating mode in which waste heat is recovered from an electric component to perform indoor heating, the controller may allow compressed refrigerant to be heated while passing through the refrigerant heater, to radiate heat while passing through the indoor condenser to heat an interior, to pass through the chiller for a battery, to absorb heat from the cooling water for an electric component while passing through the chiller for an electric component, and then to be circulated to the compressor.

In the first heating mode, the controller may operate the compressor and the refrigerant heater to allow the compressed refrigerant to be heated while passing through the refrigerant heater; fully close the first expansion valve and the second expansion valve to allow the refrigerant radiating heat while passing through the indoor condenser to flow to the branch refrigerant line; fully open the third expansion valve and stop the operation of the water pump for a battery to allow the refrigerant radiating heat while passing through the indoor condenser to directly pass through the chiller for a battery without heat exchange; and partially open the fourth expansion valve and operate the water pump for an electric component to allow the refrigerant radiating heat while passing through the indoor condenser to be expanded while passing through the fourth expansion valve and to absorb heat from the cooling water for an electric component in the chiller for an electric component.

In a second heating mode in which the temperature of the battery is increased while the indoor heating is performed by absorbing heat from indoor air, the controller may allow: compressed refrigerant to be heated while passing through the refrigerant heater, and then to radiate heat while passing through the indoor condenser to heat the interior; some of the compressed refrigerant to radiate heat while passing through the chiller for a battery to increase the temperature of the cooling water for a battery, to be expanded while passing through the fourth expansion valve, and then to be circulated to the compressor; and the remaining of the compressed refrigerant to be expanded while passing through the second expansion valve, to absorb heat while passing through the indoor evaporator, and then to be circulated to the compressor.

In the second heating mode, the controller may operate the compressor and the refrigerant heater to allow the compressed refrigerant to be heated while passing through the refrigerant heater; fully open the third expansion valve, partially open the fourth expansion valve, operate the water pump for a battery, and stop the operation of the water pump for an electric component to allow some of the compressed refrigerant radiating heat while passing through the indoor condenser to increase the temperature of the cooling water for a battery and then to be expanded while passing through the fourth expansion valve; and fully open the first expansion valve and partially open the second expansion valve to allow the remaining of the compressed refrigerant radiating heat while passing through the indoor condenser to pass through the outdoor condenser, to be expanded while passing through the second expansion valve, and then to absorb heat from indoor air while passing through the indoor evaporator.

In a third heating mode in which the temperature of the battery is increased while the indoor heating is performed by absorbing heat from outdoor air, the controller may allow: compressed refrigerant to be heated while passing through the refrigerant heater, to radiate heat while passing through the indoor condenser to heat the interior; some of the compressed refrigerant to radiate heat while passing through the chiller for a battery to increase the temperature of the cooling water for a battery, to be expanded while passing through the fourth expansion valve, and then to be circulated to the compressor; and the remaining of the compressed refrigerant to be expanded while passing through the first expansion valve, to absorb heat while passing through the outdoor condenser, and then to be circulated to the compressor.

In the third heating mode, the controller may operate the compressor and the refrigerant heater to allow the compressed refrigerant to be heated while passing through the refrigerant heater; fully open the third expansion valve, partially open the fourth expansion valve, operate the water pump for a battery, and stop the operation of the water pump for an electric component to allow some of the compressed refrigerant radiating heat while passing through the indoor condenser to increase the temperature of the cooling water for a battery and then to be expanded while passing through the fourth expansion valve; and partially open the first expansion valve and fully open the second expansion valve to allow the remaining of the compressed refrigerant radiating heat while passing through the indoor condenser to be expanded while passing through the first expansion valve, and then to absorb heat from outdoor air while passing through the outdoor condenser.

In a fourth heating mode in which waste heat is recovered from an electric component and increases the temperature of the battery while performing indoor heating, the controller may allow compressed refrigerant to be heated while passing through the refrigerant heater, and then to radiate heat while passing through the indoor condenser to heat the interior, and to radiate heat while passing through the chiller for a battery to increase the temperature of the cooling water for a battery, to absorb heat from the cooling water for an electric component while passing through the chiller for an electric component, and then to be circulated to the compressor.

In the fourth heating mode, the controller may operate the compressor and the refrigerant heater to allow the compressed refrigerant to be heated while passing through the refrigerant heater; fully close the first expansion valve and the second expansion valve to allow the refrigerant radiating heat while passing through the indoor condenser to flow to the branch refrigerant line; fully open the third expansion valve, partially open the fourth expansion valve, and operate the water pump for a battery and the water pump for an electric component to allow the refrigerant radiating heat while passing through the indoor condenser to increase the temperature of the cooling water for a battery, to be expanded while passing through the fourth expansion valve, and then to absorb heat from the cooling water for an electric component in the chiller for an electric component.

In a fifth heating mode in which waste heat is recovered from an electric component and increases the temperature of the battery while performing indoor heating by absorbing heat from outdoor air, the controller may allow: compressed refrigerant to be heated while passing through the refrigerant heater, and then to radiate heat while passing through the indoor condenser to heat the interior; some of the compressed refrigerant to radiate heat while passing through the chiller for a battery to increase the temperature of the cooling water for a battery, to absorb heat from the cooling water for an electric component while passing through the chiller for an electric component, and then to be circulated to the compressor; and the remaining of the compressed refrigerant to be expanded while passing through the first expansion valve, to absorb heat while passing through the outdoor condenser, and then to be circulated to the compressor.

In the fifth heating mode, the controller may operate the compressor and the refrigerant heater to allow the compressed refrigerant to be heated while passing through the refrigerant heater; fully open the third expansion valve, partially open the fourth expansion valve, and operate the water pump for a battery and the water pump for an electric component to allow some of the refrigerant radiating heat while passing through the indoor condenser to increase the temperature of the cooling water for a battery, to be expanded while passing through the fourth expansion valve, and then to absorb heat from the cooling water for an electric component in the chiller for an electric component; and partially open the first expansion valve and fully open the second expansion valve to allow the remaining of the compressed refrigerant radiating heat while passing through the indoor condenser to be expanded while passing through the first expansion valve, and then to absorb heat from outdoor air while passing through the outdoor condenser.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF ILLUSTRATIVE EMBODIMENTS

Hereinafter, embodiments disclosed in the present specification will be described in detail with reference to the accompanying drawings. The same reference numerals are given to the same or similar components regardless of reference numerals, and a repetitive description thereof will be omitted.

As used herein, suffixes "module" and "portion" for a component of the present disclosure are given or interchangeably used solely for ease of preparation of the specification, and do not have different meanings and each of them does not function by itself.

In the following description of an embodiment disclosed in the present specification, when a detailed description of a known related art is determined to obscure the gist of the embodiment disclosed in the present specification, the detailed description thereof will be omitted herein. In addition, the accompanying drawings are merely for easy understanding of the embodiments disclosed in the present specification, the technical spirit disclosed in the present specification is not limited by the accompanying drawings, and it should be understood to include all modifications, equivalents, and substitutes included in the spirit and technical scope of the present disclosure.

Terms including ordinal numbers such as first, second, and the like used herein may be used to describe various components, but the various components are not limited by these terms. The terms are used only for the purpose of distinguishing one component from another component.

When a component is referred to as being "connected" or "coupled" to another component, the component may be directly connected or coupled to another component, but it should be understood that sill another component may be present between the component and another component. On the contrary, when a component is referred to as being "directly connected" or "directly coupled" to another, it should be understood that still another component may not be present between the component and another component.

Unless the context clearly dictates otherwise, the singular form includes the plural form.

In the present specification, the terms "comprising," "having," or the like are used to specify that a feature, a number, a step, an operation, a component, an element, or a combination thereof described herein exists, and they do not preclude the possibility of presence or addition of one or more other features, numbers, steps, operations, components, elements, or combinations thereof.

Figure 1:
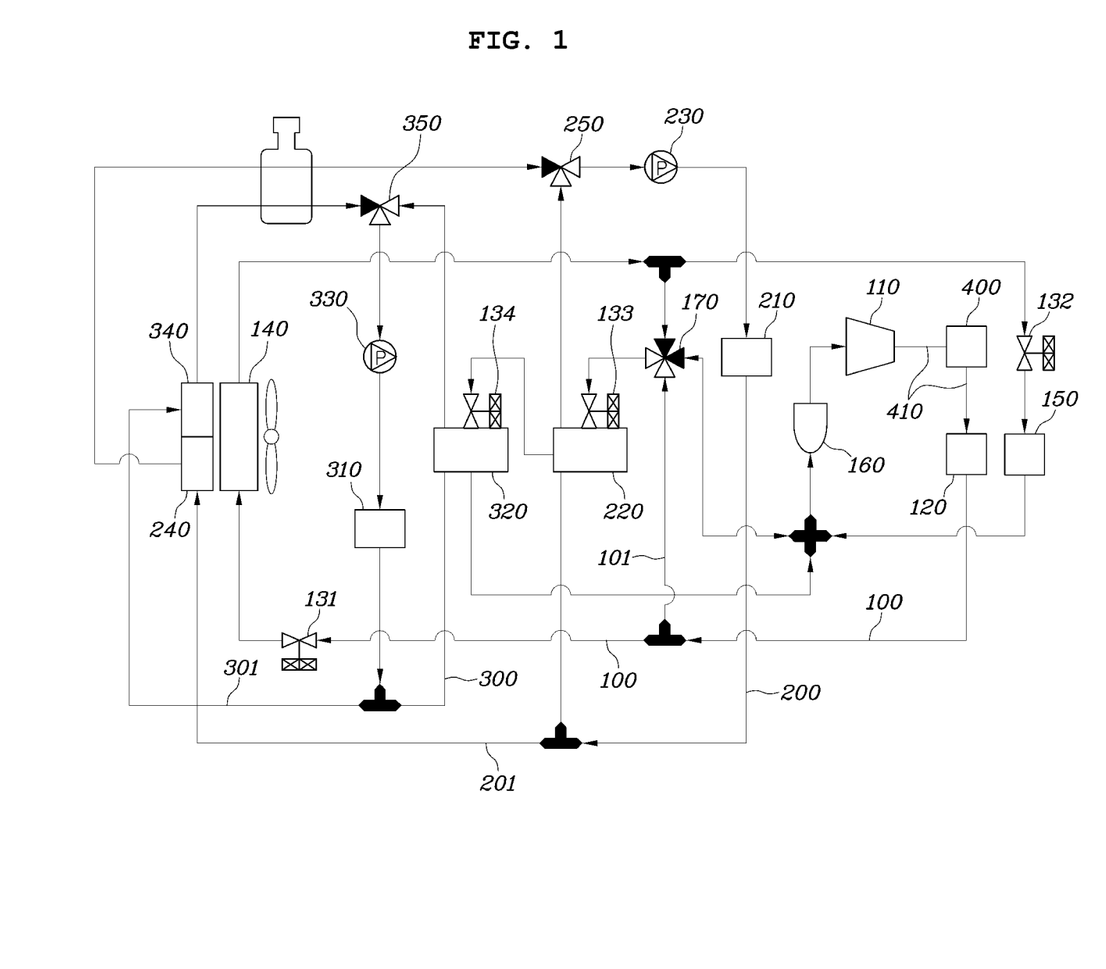
FIG. 1 is a circuit diagram illustrating a thermal management system for a vehicle according to one embodiment of the present disclosure.

FIG. 1 is a circuit diagram illustrating a thermal management system for a vehicle according to one embodiment of the present disclosure.

As shown in FIG. 1, the thermal management system for a vehicle according to an embodiment of the present invention includes a main refrigerant line 100 and a branch refrigerant line 101 through which a refrigerant is circulated and which heat an interior, a battery cooling water line 200 through which cooling water for a battery is circulated and which increases a temperature of a battery 210, and an electric component cooling water line 300 through which cooling water for electric components is circulated and which recovers waste heat of an electric component 310.

In this case, a compressor 110, an indoor condenser 120, a first expansion valve 131, an outdoor condenser 140, a second expansion valve 132, and an indoor evaporator 150 are sequentially provided in the main refrigerant line 100, and heat exchange is performed while a refrigerant for air conditioning is circulated. In this case, a gas-liquid separator 160 may be further provided at an upstream point of the compressor 110.

In addition, the branch refrigerant line 101 is provided to branch from a downstream point of the indoor condenser 120, pass through the battery cooling water line 200 and the electric component cooling water line 300, pass through chillers 220 and 320 in which heat exchange is performed between the cooling water for a battery and the cooling water for electric components, and then flows into the compressor 110.

In this case, the chillers 220 and 320 include a chiller 220 for a battery provided in the battery cooling water line 200 and a chiller 320 for an electric component provided in the electric component cooling water line 300.

In addition, in the branch refrigerant line 101, a third expansion valve 133 is provided at an upstream point of the chiller 220 for a battery, and a fourth expansion valve 134 is provided at an upstream point of the chiller 320 for an electric component.

In addition, in the branch refrigerant line 101, a multi-way valve 170 that provides a path through which the refrigerant flows into the compressor 110 may be provided at an upstream point of the third expansion valve 133.

Meanwhile, the battery 210, the chiller 220 for a battery, and a water pump 230 for a battery are sequentially provided in the battery cooling water line 200 so that the cooling water for a battery is circulated and is selectively heat-exchanged with the refrigerant flowing from the chiller 220 for a battery to the branch refrigerant line 101, thereby absorbing heat.

In addition, a branch battery cooling water line 201, which branches from a downstream point of the battery, passes through a first radiator 240, and then joins at an upstream point of the water pump 230 for a battery, is further provided in the battery cooling water line 200. In this case, a multi-way valve 250 is provided at a joining point of the branch battery cooling water line 201 and the battery cooling water line 200 to control a flow path of the cooling water for a battery.

In addition, the electric component 310, the chiller 320 for an electric component, and a water pump 330 for an electric component are sequentially provided in the electric component cooling water line 300, and the cooling water for an electric component is circulated and is selectively heat-exchanged with the refrigerant flowing from the chiller 320 for an electric component to the branch refrigerant line 101, thereby radiating heat.

In addition, a branch electric component cooling water line 301, which branches from a downstream point of the electric component 310, passes through a second radiator 340, and then joins at an upstream point of the water pump 330 for an electric component, is further provided in the electric component cooling water line 300. In this case, a multi-way valve 350 is provided at a joining point of the branch electric component cooling water line 301 and the electric component cooling water line 300 to control a flow path of the cooling water for an electric component.

Meanwhile, a refrigerant heater 400 is provided in the main refrigerant line 100 to selectively heat the refrigerant between the compressor 110 and the indoor condenser 120. Thus, an operation of the refrigerant heater 400 may additionally heat the refrigerant compressed by the compressor 110.

In addition, a controller (not shown) is further provided to control the operations of the compressor 110 and the refrigerant heater 400, control opening and closing of the first expansion valve 131 to the fourth expansion valve 134 and opening degrees thereof, control operations of the water pump 330 for an electric component and the water pump 230 for a battery, and control the flow paths of the refrigerant, the cooling water for an electric component, and the cooling water for a battery.

Hereinafter, various examples of the refrigerant heater and operating states of various heating modes will be described in detail.

Figure 2:
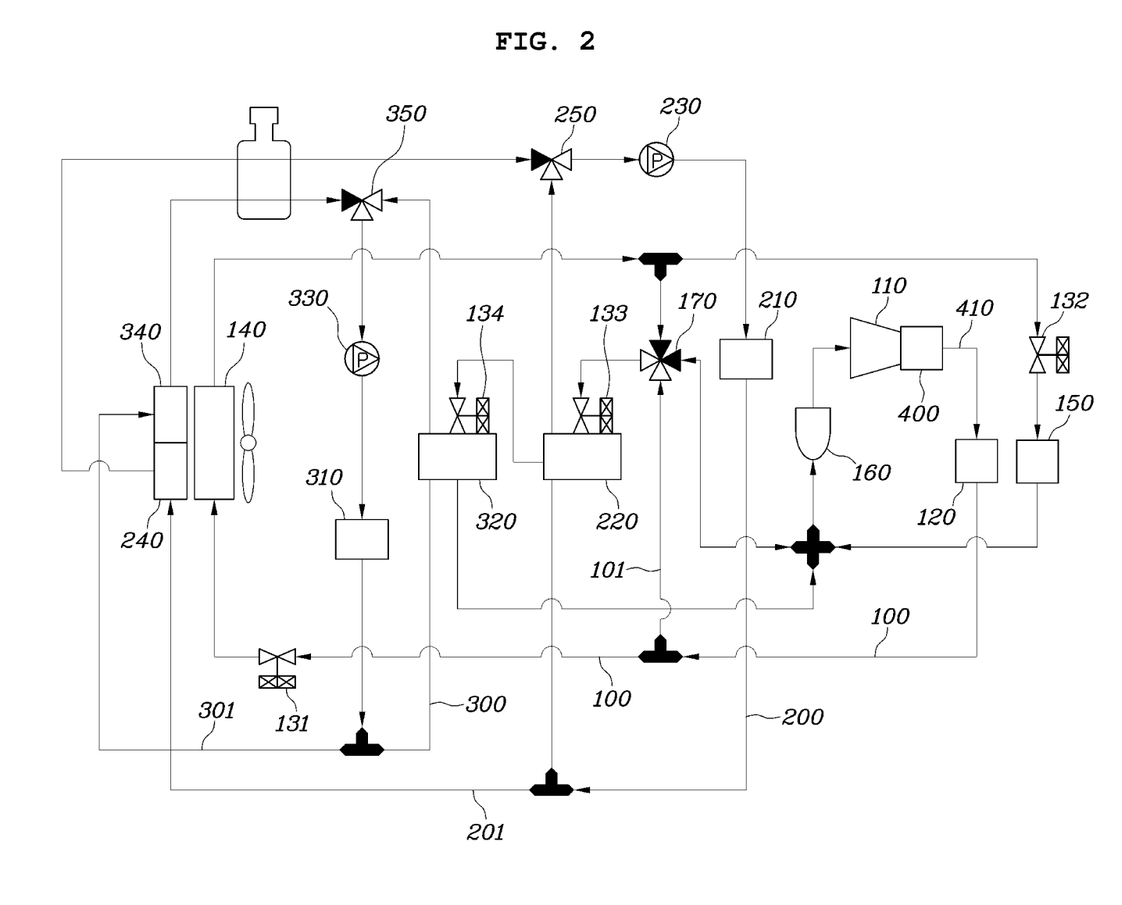
FIGS. 2 and 3 are circuit diagrams illustrating various embodiments of a refrigerant heater in the thermal management system for a vehicle according to one embodiment of the present disclosure.
Figure 3:
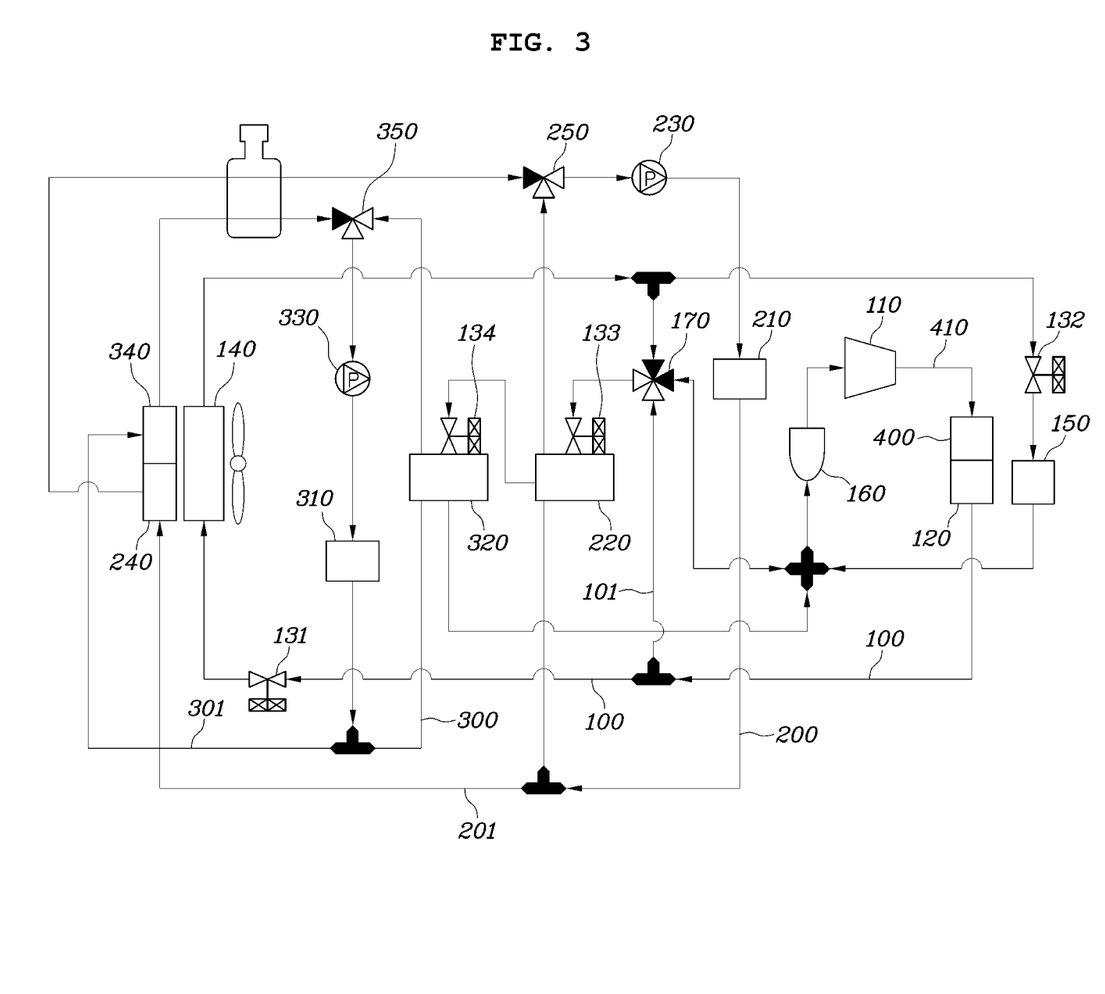

FIG. 1 to 3 are circuit diagrams illustrating various examples of the refrigerant heater in in the thermal management system for a vehicle according to one embodiment of the present invention, and FIG. 1 shows an example in which the refrigerant heater is separately provided from the compressor and the indoor condenser.

As shown in FIG. 1, the refrigerant heater 400 is separately provided from the compressor 110 at a downstream point of the compressor 110. In this case, it is preferable that the compressor 110 and the refrigerant heater 400 are connected by a flow path member 410 for high temperature and high pressure to allow the refrigerant of high temperature and high pressure to flow. In addition, an outer side of the flow path member 410 may be covered by an insulating member.

In this case, a pipe or a hose may be applied as the flow path member 410, and resin foam may be applied as the insulating member.

In addition, as shown in FIG. 2, the refrigerant heater 400 may be integrally provided at a rear end of the compressor 110.

In addition, as shown in FIG. 3, the refrigerant heater 400 may be integrally provided at a front end of the indoor condenser 120.

As can be seen from FIGS. 1 to 3, the refrigerant heater 400 may be disposed and implemented in various ways between the compressor 110 and the indoor condenser 120 and may be implemented as various structures capable of increasing the temperature of the refrigerant compressed by the compressor 110 according to the arrangement position.

In this way, the refrigerant heater 400 capable of heating the refrigerant may be provided between the compressor 110 and the indoor condenser 120, which makes it possible to omit the PTC heater for indoor heating conventionally disposed in the main refrigerant line 100 for indoor heating and the water heating heater disposed in the battery cooling water line 200 for increasing the temperature of the battery 210.

Next, various modes of the thermal management system for a vehicle according to the present disclosure, which is configured as described above, will be described with reference to the drawings.

FIGS. 4 to 8 are circuit diagrams illustrating various heating modes of the thermal management system for a vehicle according to one embodiment of the present disclosure.

In the present embodiment, in describing the expansion valves, an opening degree of the expansion valve is divided into "Full Open," "Partial Open," and "Full Close."

Here, "Full Open" means that the opening degree of the expansion valve is 100%, and in this case, the refrigerant passing through the expansion valve passes through the expansion valve without being expanded.

In addition, "Partial Open" means that the opening degree of the expansion valve is greater than 0% and less than 100%, and in this case, the refrigerant passing through the expansion valve is expanded.

In addition, "Full Close" means that the opening degree of the expansion valve is 0%, and in this case, the refrigerant does not pass through the expansion valve.

Figure 4:
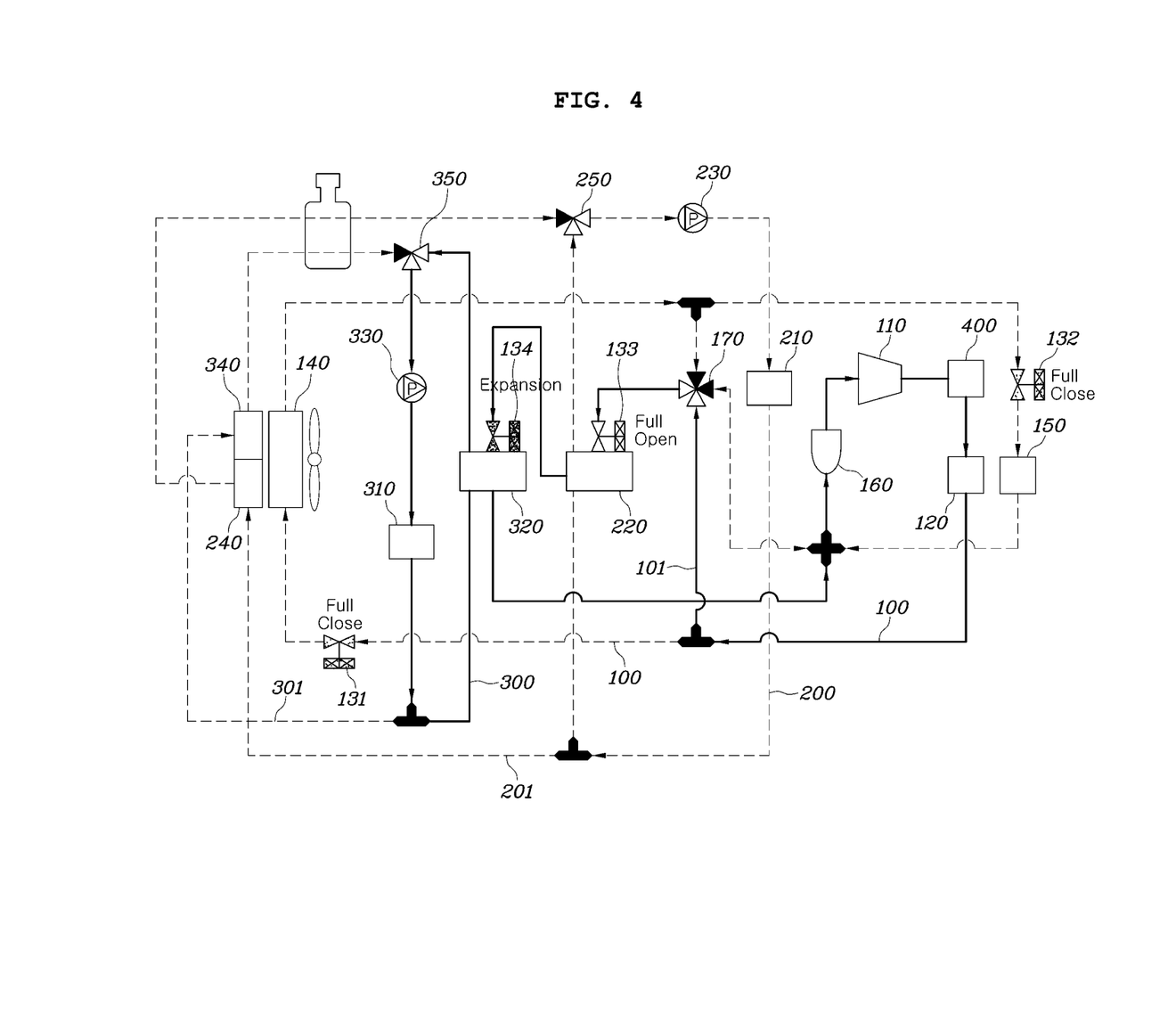
FIGS. 4 to 8 are circuit diagrams illustrating various heating modes of the thermal management system for a vehicle according to one embodiment of the present disclosure.

FIG. 4 shows a first heating mode in which the indoor heating is performed by recovering waste heat from the electric component without increasing the temperature of the battery.

In the first heating mode, the compressed refrigerant is heated while passing through the refrigerant heater 400 and then radiates heat while passing through the indoor condenser 120 to heat the interior.

In addition, the refrigerant radiating heat in the indoor condenser 120 flows into the branch refrigerant line 101, directly passes through the chiller 220 for a battery, absorbs heat from the cooling water for an electric component while passing through the chiller 320 for an electric component, and then is circulated to the compressor 110.

To this end, the controller operates the compressor 110 and the refrigerant heater 400 to allow the compressed refrigerant to be heated while passing through the refrigerant heater 400.

Then, the controller fully closes the first expansion valve 131 and the second expansion valve 132 to allow the refrigerant radiating heat while passing through the indoor condenser 120 to flow to the branch refrigerant line 101.

In addition, the controller fully opens the third expansion valve 133 and partially opens the fourth expansion valve 134 to allow the refrigerant radiating heat while passing through the indoor condenser 120 to directly pass through the chiller 220 for a battery without heat exchange in the chiller 220 for a battery, to be expanded while passing through the fourth expansion valve 134, and then to absorb heat from the cooling water for an electric component in the chiller 320 for an electric component.

Then, the controller stops the operation of the water pump 230 for a battery, and operates only the water pump 330 for an electric component.

Accordingly, the refrigerant compressed by the compressor 110 is heated while passing through the refrigerant heater 400 to become a high-temperature and high-pressure state. The high-temperature and high-pressure refrigerant radiates heat while passing through the indoor condenser 120 to heat the interior.

In addition, since the first expansion valve 131 and the second expansion valve 132 are in the fully closed state, the refrigerant passing through the indoor condenser 120 flows along the branch refrigerant line 101.

Therefore, the refrigerant flowing along the branch refrigerant line 101 passes through the fully opened third expansion valve 133 and then passes through the chiller 220 for a battery. In this case, since the cooling water for a battery does not circulate in the chiller 220 for a battery, the refrigerant is not heat-exchanged with the cooling water for a battery and directly passes through the chiller 220 for a battery.

In addition, the refrigerant passing through the chiller 220 for a battery is expanded while passing through the partially opened fourth expansion valve 134 and then absorbs heat while being heat-exchanged with the cooling water for an electric component in the chiller 320 for an electric component. In this way, the refrigerant absorbing the waste heat of the electric component 310 flows into the compressor 110.

Figure 5:
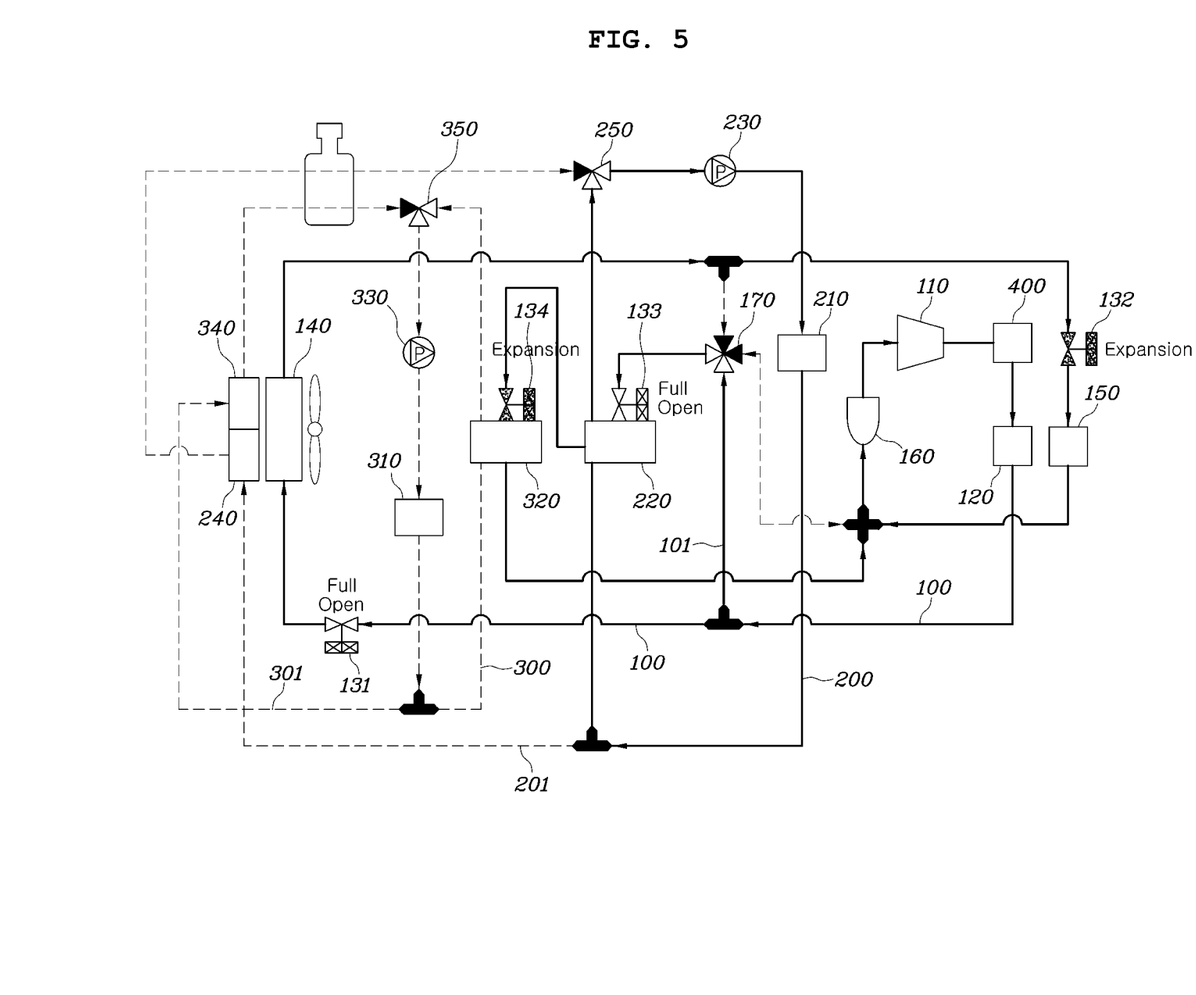

Next, FIG. 5 illustrates a second heating mode in which the temperature of the battery is increased while the indoor heating is performed by absorbing heat from the indoor air.

In the second heating mode, the compressed refrigerant is heated while passing through the refrigerant heater 400 and then radiates heat while passing through the indoor condenser 120 to heat the interior.

In addition, some of the refrigerant radiating heat in the indoor condenser 120 branches to the branch refrigerant line 101 and then radiates heat while passing through the chiller 220 for a battery to increase the temperature of the cooling water for a battery to increase the temperature of the battery 210.

In addition, the refrigerant radiating heat while being heat-exchanged with the cooling water for a battery is expanded while passing through the fourth expansion valve 134 and then is circulated to the compressor 110.

On the other hand, the remaining of the refrigerant radiating heat in the indoor condenser 120 is expanded while passing through the second expansion valve 132, absorbs heat while passing through the indoor evaporator 150, and then is circulated to the compressor 110.

To this end, the controller operates the compressor 110 and the refrigerant heater 400 to allow the compressed refrigerant to be heated while passing through the refrigerant heater 400.

In addition, the controller fully opens the third expansion valve 133 and partially opens the fourth expansion valve 134 to allow some of the refrigerant radiating heat while passing through the indoor condenser 120 to increase the temperature of the cooling water for a battery and then is expanded while passing through the fourth expansion valve 134. In addition, the controller operates the water pump 230 for a battery, and stops the operation of the water pump 330 for an electric component.

Then, the controller fully opens the first expansion valve 131 and partially opens the second expansion valve 132 to allow the remaining of the refrigerant radiating heat the indoor condenser 120 to be expanded while passing through the outdoor condenser 140, to be expanded while passing through the second expansion valve 132, and then to absorb heat from the indoor air while passing through the indoor evaporator 150.

Accordingly, the refrigerant compressed by the compressor 110 is heated while passing through the refrigerant heater 400 to become a high-temperature and high-pressure state. The high-temperature and high-pressure refrigerant radiates heat while passing through the indoor condenser 120 to heat the interior.

In addition, some of the refrigerant passing through the indoor condenser 120 flows along the branch refrigerant line 101, passes through the fully opened third expansion valve 133, and then radiates heat while being heat-exchanged with the cooling water for a battery in the chiller 220 for a battery, and the cooling water for a battery absorbing the heat from the refrigerant is circulated in the battery cooling water line 200 to increase the temperature of the battery 210.

Then, the refrigerant radiating heat in the chiller 220 for a battery is expanded while passing through the partially opened fourth expansion valve 134 and then flows into the compressor 110.

On the other hand, the remaining of the refrigerant radiating heat while passing through the indoor condenser 120 passes through the fully opened first expansion valve 131 and the outdoor condenser 140 along the main refrigerant line 100 and then is expanded while passing through the partially opened second expansion valve 132. Then, the remaining of the refrigerant joins the refrigerant, which absorbs the heat while passing through the indoor evaporator 150, flows into the branch refrigerant line 101, and then is expanded while passing through the fourth expansion valve 134, and then flows into the compressor 110.

Figure 6:
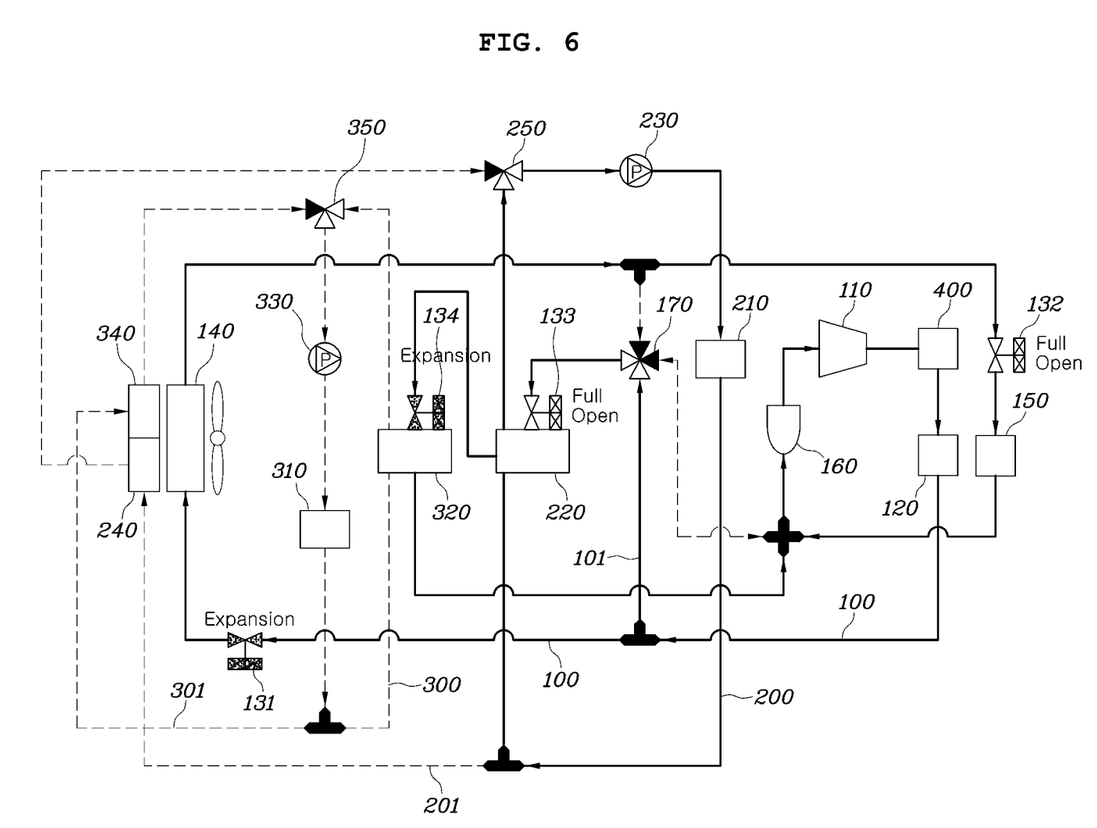

Next, FIG. 6 shows a third heating mode in which the temperature of the battery is increased while the indoor heating is performed by absorbing heat from the outdoor air.

In the third heating mode, the compressed refrigerant is heated while passing through the refrigerant heater 400 and then radiates heat while passing through the indoor condenser 120 to heat the interior.

In addition, some of the refrigerant radiating heat in the indoor condenser 120 branches to the branch refrigerant line 101 and then radiates heat while passing through the chiller 220 for a battery to increase the temperature of the cooling water for a battery to increase the temperature of the battery 210.

In addition, the refrigerant radiating heat while being heat-exchanged with the cooling water for a battery is expanded while passing through the fourth expansion valve 134 and then is circulated to the compressor 110.

On the other hand, the remaining of the refrigerant radiating heat in the indoor condenser 120 is expanded while passing through the first expansion valve 131, absorbs heat while passing through the outdoor condenser 140, and then is circulated to the compressor 110.

To this end, the controller operates the compressor 110 and the refrigerant heater 400 to allow the compressed refrigerant to be heated while passing through the refrigerant heater 400.

In addition, the controller fully opens the third expansion valve 133 and partially opens the fourth expansion valve 134 to allow some of the refrigerant radiating heat in the indoor condenser 120 to increase the temperature of the cooling water for a battery and then to be expanded while passing through the fourth expansion valve 134. In addition, the controller operates the water pump 230 for a battery, and stops the operation of the water pump 330 for an electric component.

Then, the controller partially opens the first expansion valve 131 and fully opens the second expansion valve 132 to allow the remaining of the refrigerant radiating heat while passing through the indoor condenser 120 to be expanded while passing through the first expansion valve 131 and then to absorb heat from the outdoor air while passing through the outdoor condenser 140.

Accordingly, the refrigerant compressed by the compressor 110 is heated while passing through the refrigerant heater 400 to become a high-temperature and high-pressure state. The high-temperature and high-pressure refrigerant radiates heat while passing through the indoor condenser 120 to heat the interior.

In addition, some of the refrigerant passing through the indoor condenser 120 flows along the branch refrigerant line 101, passes through the fully opened third expansion valve 133, and then radiates heat while being heat-exchanged with the cooling water for a battery in the chiller 220 for a battery, and the cooling water for a battery absorbing the heat from the refrigerant is circulated in the battery cooling water line 200 to increase the temperature of the battery 210.

Then, the refrigerant radiating heat in the chiller 220 for a battery is expanded while passing through the partially opened fourth expansion valve 134 and then flows into the compressor 110.

On the other hand, the remaining of the refrigerant radiating heat while passing through the indoor condenser 120 is expanded while passing through the partially opened first expansion valve 131 along the main refrigerant line 100, absorbs heat from the outside air while passing through the outdoor condenser 140, passes through the fully opened second expansion valve 132 and the indoor evaporator 150, flows into the branch refrigerant line 101, joins the expanded refrigerant while passing through the fourth expansion valve 134, and then flows into the compressor 110.

Figure 7:
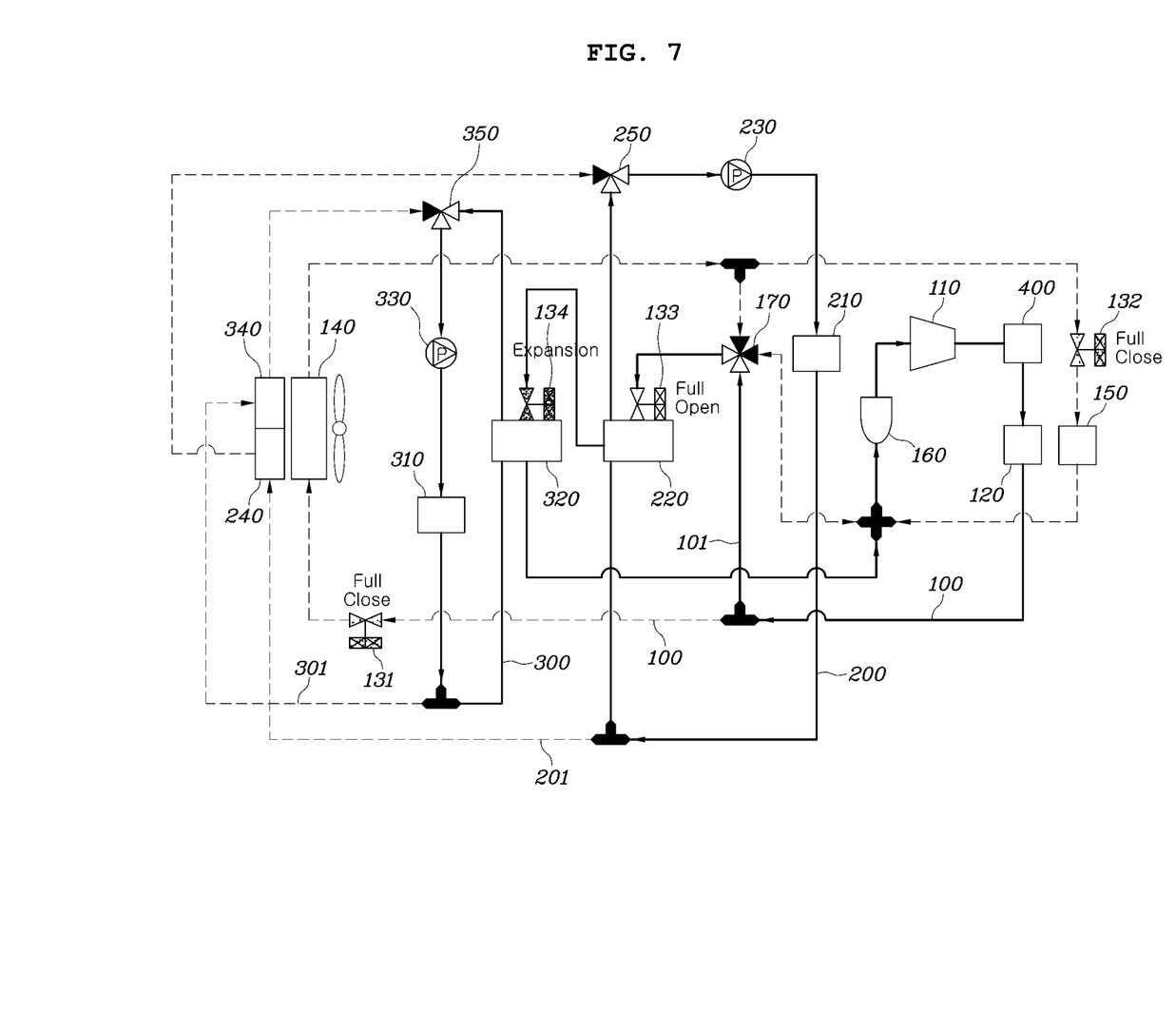

Next, FIG. 7 shows a fourth heating mode in which the temperature of the battery is increased while the indoor heating is performed by recovering waste heat from an electric component.

In the fourth heating mode, the compressed refrigerant is heated while passing through the refrigerant heater 400 and then radiates heat while passing through the indoor condenser 120 to heat the interior.

In addition, all the refrigerant radiating heat in the indoor condenser 120 flows into the branch refrigerant line 101, and then radiates heat while passing through the chiller 220 for a battery to increase the temperature of the cooling water for a battery. Then, the refrigerant absorbs heat from the cooling water for an electric component while passing through the chiller 320 for an electric component and then is circulated to the compressor 110.

To this end, the controller operates the compressor 110 and the refrigerant heater 400 to allow the compressed refrigerant to be heated while passing through the refrigerant heater 400.

Then, the controller fully closes the first expansion valve 131 and the second expansion valve 132 to allow the refrigerant radiating heat while passing through the indoor condenser 120 to flow to the branch refrigerant line 101.

In addition, the controller fully opens the third expansion valve 133 and partially opens the fourth expansion valve 134 to allow the refrigerant radiating heat while passing through the indoor condenser 120 to increase the temperature of the cooling water for a battery, to be expanded while passing through the fourth expansion valve 134, and then to absorb heat from the cooling water for an electric component in the chiller 320 for an electric component.

In addition, the controller operates both of the water pump 230 for a battery and the water pump 330 for an electric component.

Accordingly, the refrigerant compressed by the compressor 110 is heated while passing through the refrigerant heater 400 to become a high-temperature and high-pressure state. The high-temperature and high-pressure refrigerant radiates heat while passing through the indoor condenser 120 to heat the interior.

In addition, since the first expansion valve 131 and the second expansion valve 132 are in the fully closed state, all the refrigerant passing through the indoor condenser 120 flows along the branch refrigerant line 101.

Therefore, the refrigerant flowing along the branch refrigerant line 101 passes through the fully opened third expansion valve 133 and then radiates heat while being heat-exchanged with the cooling water for a battery in the chiller 220 for a battery, and the cooling water for a battery absorbing the heat from the refrigerant is circulated in the battery cooling water line 200 to increase the temperature of the battery 210.

In addition, the refrigerant radiating heat in the chiller 220 for a battery is expanded while passing through the partially opened fourth expansion valve 134 and then absorbs heat while being heat-exchanged with the cooling water for an electric component in the chiller 320 for an electric component. In this way, the refrigerant absorbing the waste heat of the electric component 310 flows into the compressor 110.

Figure 8:
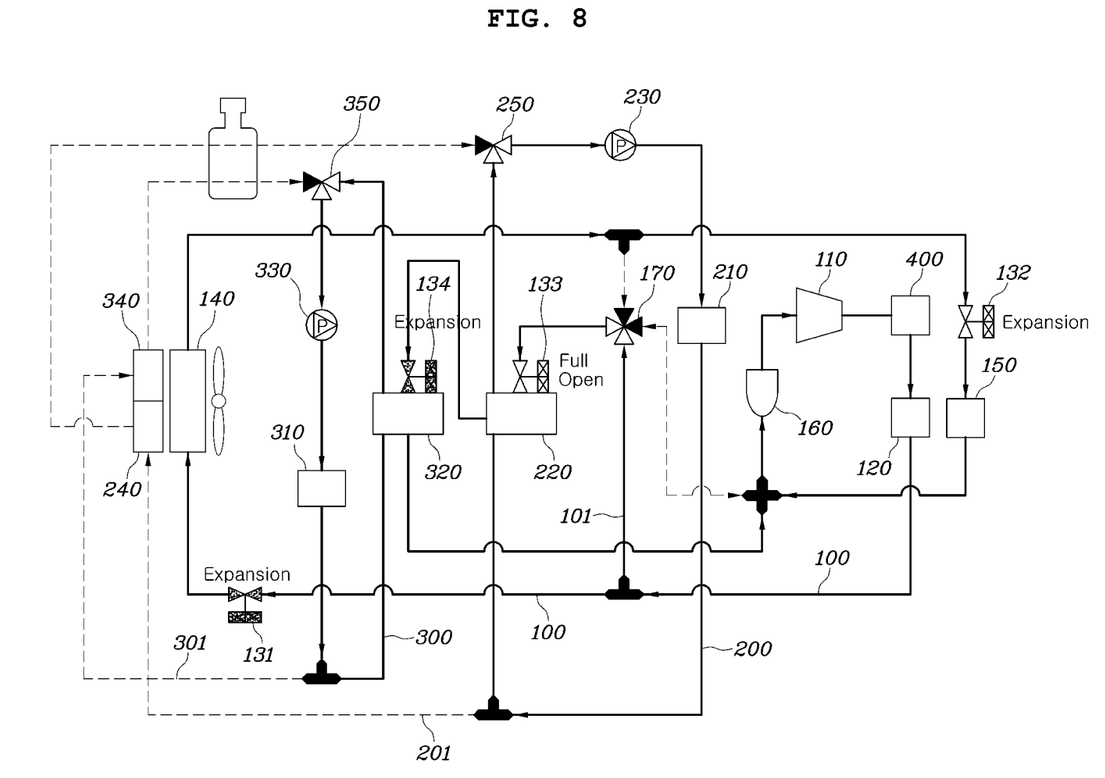

Next, FIG. 8 shows a fifth heating mode in which waste heat recovered from an electric component is recovered, and the temperature of the battery is increased while the indoor heating is performed by absorbing heat from the outdoor air.

In the fifth heating mode, the compressed refrigerant is heated while passing through the refrigerant heater 400 and then radiates heat while passing through the indoor condenser 120 to heat the interior.

In addition, some of the refrigerant radiating heat in the indoor condenser 120 branches to the branch refrigerant line 101 and then radiates heat while passing through the chiller 220 for a battery to increase the temperature of the cooling water for a battery to increase the temperature of the battery 210.

In addition, the refrigerant radiating heat while being heat-exchanged with the cooling water for a battery is expanded while passing through the fourth expansion valve 134 and then is circulated to the compressor 110.

On the other hand, the remaining of the refrigerant radiating heat in the indoor condenser 120 is expanded while passing through the first expansion valve 131, absorbs heat while passing through the outdoor condenser 140, and then is circulated to the compressor 110.

To this end, the controller operates the compressor 110 and the refrigerant heater 400 to allow the compressed refrigerant to be heated while passing through the refrigerant heater 400.

In addition, the controller fully opens the third expansion valve 133 and partially opens the fourth expansion valve 134 to allow the refrigerant radiating heat while passing through the indoor condenser 120 to increase the temperature of the cooling water for a battery, to be expanded while passing through the fourth expansion valve 134, and then to absorb heat from the cooling water for an electric component in the chiller 320 for an electric component.

In addition, the controller operates both of the water pump 230 for a battery and the water pump 330 for an electric component.

Accordingly, the refrigerant compressed by the compressor 110 is heated while passing through the refrigerant heater 400 to become a high-temperature and high-pressure state. The high-temperature and high-pressure refrigerant radiates heat while passing through the indoor condenser 120 to heat the interior.

In addition, some of the refrigerant passing through the indoor condenser 120 flows along the branch refrigerant line 101, passes through the fully opened third expansion valve 133, and then radiates heat while being heat-exchanged with the cooling water for a battery in the chiller 220 for a battery, and the cooling water for a battery absorbing the heat from the refrigerant is circulated in the battery cooling water line 200 to increase the temperature of the battery 210.

In addition, the refrigerant radiating heat in the chiller 220 for a battery is expanded while passing through the partially opened fourth expansion valve 134 and then absorbs heat while being heat-exchanged with the cooling water for an electric component in the chiller 320 for an electric component. In this way, the refrigerant absorbing the waste heat of the electric component 310 flows into the compressor 110.

On the other hand, the remaining of the refrigerant radiating heat while passing through the indoor condenser 120 is expanded while passing through the partially opened first expansion valve 131 along the main refrigerant line 100, absorbs heat from the outside air while passing through the outdoor condenser 140, passes through the fully opened second expansion valve 132 and the indoor evaporator 150, flows into the branch refrigerant line 101, joins the refrigerant absorbing the heat while passing through the chiller 320 for an electric component, and then flows into the compressor 110.

As described above, in the various heating modes according to the present embodiment, the refrigerant compressed by the compressor 110 is heated while passing through the refrigerant heater 400, which enables the increase in the temperature of the refrigerant, which is insufficient only with the heat pump. Therefore, it is possible to maintain performance and efficiency of the heat pump by vaporizing the refrigerant in a liquid state on the basis of the refrigerant heater even in a low outdoor temperature condition.

In addition, it is possible to implement a mode in which the heat pump function may be used even when the temperature of the battery 210 is increased.

The controller according to an exemplary embodiment of the present disclosure may be implemented through an algorithm configured to control operations of various components of the vehicle, a non-volatile memory (not shown) configured to store data relating to software commands to reproduce the algorithm, and a processor (not shown) configured to perform operations, which will be described below, using data stored in a corresponding memory. Here, the memory and the processor may be implemented as separate chips. Alternatively, the memory and the processor may be implemented as a single chip in which the memory and the processor are integrated. The processor may be in the form of one or more processors.

In accordance with the embodiments of the present disclosure, effects described below can be obtained.

First, in a general thermal management circuit for an electric vehicle, a refrigerant heater for heating a refrigerant at a downstream point of a compressor can be provided by replacing a water heating heater for increasing a temperature of a battery and an air heating heater (a positive temperature coefficient (PTC) heater) for indoor heating. Therefore, the number of heaters can be reduced, and thus cost reduction and weight reduction can be expected, and a package of the thermal management system can be advantageously achieved, and the slimness of a heating, ventilating, and air conditioning (HVAC) module can be achieved.

Second, in the general thermal management circuit for an electric vehicle, the heat pump function cannot be used when the temperature of the battery is increased. However, according to the present disclosure, even when the temperature of the battery is increased, it is possible to implement a thermal management circuit which can use a heat pump function on the basis of the refrigerant heater, thereby improving energy efficiency.

Third, even in a condition of a low outside temperature (−20° C.), a refrigerant in a liquid can be vaporized on the basis of the refrigerant heater, which makes it possible to maintain performance and efficiency of the heat pump.

Although the present disclosure has been described with reference to the accompanying drawings and the above-described exemplary embodiments, the present disclosure is not limited thereto and is limited by the appended claims. Therefore, the present disclosure can be variously modified and altered by those skilled in the art without departing from the scope of the technical spirit of the appended claims.

What is claimed is:

1. A thermal management system for a vehicle, the thermal management system comprising:
   a main refrigerant line in which a compressor, an indoor condenser, a first expansion valve, an outdoor condenser, a second expansion valve, and an indoor evaporator are sequentially provided, the main refrigerant line configured to circulate a refrigerant for air conditioning to perform heat exchange;
   a branch refrigerant line which branches from a downstream point of the indoor condenser, passes through a chiller for a battery and a chiller for an electric component, and is introduced into the compressor;
   a battery cooling water line in which the battery, the chiller for the battery, and a water pump for the battery are sequentially provided and which is connected such that cooling water for the battery is circulated and absorbs heat while being selectively heat-exchanged with a refrigerant flowing from the chiller for the battery to the branch refrigerant line;
   an electric component cooling water line in which the electric component, the chiller for the electric component, and a water pump for the electric component are sequentially provided and which is connected such that cooling water for the electric component is circulated and radiates heat while being selectively heat-exchanged with the refrigerant flowing from the chiller for the electric component to the branch refrigerant line;
   a refrigerant heater disposed between the compressor and the indoor condenser on the main refrigerant line and configured to selectively heat the refrigerant; and
   a controller configured to control operations of the compressor and the refrigerant heater, control opening and closing of the first expansion valve and the second expansion valve and opening degrees thereof, control operations of the water pump for the electric component and the water pump for the battery, and control flow paths of the refrigerant, the cooling water for the electric component, and the cooling water for the battery.

2. The thermal management system of claim 1, wherein in the branch refrigerant line, a third expansion valve is provided at an upstream point of the chiller for the battery, and a fourth expansion valve is provided at an upstream point of the chiller for the electric component; and
   the controller controls opening and closing of the third expansion valve and the fourth expansion valve and opening degrees thereof.

3. The thermal management system of claim 1, further comprising:
   a positive temperature coefficient (PTC) heater configured to perform indoor heating, wherein the PTC heater is not disposed on the main refrigerant line; and
   a water heating heater configured to increase a temperature of the battery, wherein the water heating heater is not disposed on the battery cooling water line.

4. The thermal management system of claim 1, wherein the refrigerant heater is integrally provided at a rear end of the compressor.

5. The thermal management system of claim 1, wherein: the refrigerant heater is separately provided from the compressor at a downstream point of the compressor, the compressor and the refrigerant heater are connected to a flow path member for high temperature and high pressure so that a high-temperature and high-pressure refrigerant flows, and
   an outer side of the flow path member is covered by an insulating member.

6. The thermal management system of claim 5, wherein the flow path member includes a pipe or a hose; and the insulating member includes resin foam.

7. The thermal management system of claim 1, wherein the refrigerant heater is integrally provided at a front end of the indoor condenser.

8. The thermal management system of claim 2, wherein, in a first heating mode in which waste heat is recovered from the electric component to perform indoor heating, the controller allows compressed refrigerant to be heated while passing through the refrigerant heater, to radiate heat while passing through the indoor condenser to heat an interior, to pass through the chiller for the battery, to absorb heat from the cooling water for the electric component while passing through the chiller for the electric component, and then to be circulated to the compressor.

9. The thermal management system of claim 8, wherein, in the first heating mode, the controller is configured to:
   operate the compressor and the refrigerant heater to allow the compressed refrigerant to be heated while passing through the refrigerant heater;
   fully close the first expansion valve and the second expansion valve to allow the refrigerant radiating heat while passing through the indoor condenser to flow to the branch refrigerant line;
   fully open the third expansion valve and stop the operation of the water pump for the battery to allow the refrigerant radiating heat while passing through the indoor condenser to directly pass through the chiller for the battery without heat exchange; and
   partially open the fourth expansion valve and operate the water pump for the electric component to allow the refrigerant radiating heat while passing through the indoor condenser to be expanded while passing through the fourth expansion valve and to absorb heat from the cooling water for the electric component in the chiller for the electric component.

10. The thermal management system of claim 2, wherein, in a second heating mode in which a temperature of the battery is increased while indoor heating is performed by absorbing heat from indoor air, the controller is configured to allow:
    compressed refrigerant to be heated while passing through the refrigerant heater and then to radiate heat while passing through the indoor condenser to heat an interior;
    some of the compressed refrigerant to radiate heat while passing through the chiller for the battery to increase a temperature of the cooling water for the battery, to be expanded while passing through the fourth expansion valve, and then to be circulated to the compressor; and
    a remaining of the compressed refrigerant to be expanded while passing through the second expansion valve, to absorb heat while passing through the indoor evaporator, and then to be circulated to the compressor.

11. The thermal management system of claim 10, wherein in the second heating mode, the controller is configured to:
    operate the compressor and the refrigerant heater to allow the compressed refrigerant to be heated while passing through the refrigerant heater;

fully open the third expansion valve, partially open the fourth expansion valve, operate the water pump for the battery, and stop the operation of the water pump for the electric component to allow some of the compressed refrigerant radiating heat while passing through the indoor condenser to increase the temperature of the cooling water for the battery and then to be expanded while passing through the fourth expansion valve; and fully open the first expansion valve and partially open the second expansion valve to allow the remainder of the compressed refrigerant radiating heat while passing through the indoor condenser to pass through the outdoor condenser, to be expanded while passing through the second expansion valve, and then to absorb heat from indoor air while passing through the indoor evaporator.

12. The thermal management system of claim 2, wherein, in a third heating mode in which a temperature of the battery is increased while indoor heating is performed by absorbing heat from outdoor air, the controller is configured to allow:

compressed refrigerant to be heated while passing through the refrigerant heater and then to radiate heat while passing through the indoor condenser to heat an interior;

some of the compressed refrigerant to radiate heat while passing through the chiller for a battery to increase the temperature of the cooling water for the battery, to be expanded while passing through the fourth expansion valve, and then to be circulated to the compressor; and the remaining of the compressed refrigerant to be expanded while passing through the first expansion valve, to absorb heat while passing through the outdoor condenser, and then to be circulated to the compressor.

13. The thermal management system of claim 12, wherein, in the third heating mode, the controller is configured to:

operate the compressor and the refrigerant heater to allow the compressed refrigerant to be heated while passing through the refrigerant heater;

fully open the third expansion valve, partially open the fourth expansion valve, operate the water pump for the battery, and stop the operation of the water pump for the electric component to allow some of the compressed refrigerant radiating heat while passing through the indoor condenser to increase the temperature of the cooling water for the battery and then to be expanded while passing through the fourth expansion valve; and partially open the first expansion valve and fully open the second expansion valve to allow a remaining of the compressed refrigerant radiating heat while passing through the indoor condenser to be expanded while passing through the first expansion valve, and then to absorb heat from outdoor air while passing through the outdoor condenser.

14. The thermal management system of claim 2, wherein, in a fourth heating mode in which waste heat is recovered from the electric component and increases a temperature of the battery while performing indoor heating, the controller is configured to allow compressed refrigerant:

to be heated while passing through the refrigerant heater, and then to radiate heat while passing through the indoor condenser to heat an interior; and to radiate heat while passing through the chiller for the battery to increase a temperature of the cooling water for the battery, to absorb heat from the cooling water for the electric component while passing through the chiller for the electric component, and then to be circulated to the compressor.

15. The thermal management system of claim 14, wherein, in the fourth heating mode, the controller is configured to:

operate the compressor and the refrigerant heater to allow the compressed refrigerant to be heated while passing through the refrigerant heater;

fully close the first expansion valve and the second expansion valve to allow the refrigerant radiating heat while passing through the indoor condenser to flow to the branch refrigerant line; and fully open the third expansion valve, partially open the fourth expansion valve, and operate the water pump for the battery and the water pump for the electric component to allow the refrigerant radiating heat while passing through the indoor condenser to increase the temperature of the cooling water for the battery, to be expanded while passing through the fourth expansion valve, and then to absorb heat from the cooling water for the electric component in the chiller for the electric component.

16. The thermal management system of claim 2, wherein, in a fifth heating mode in which waste heat is recovered from the electric component and increases a temperature of the battery while performing indoor heating by absorbing heat from outdoor air, the controller is configured to allow:

compressed refrigerant to be heated while passing through the refrigerant heater, and then to radiate heat while passing through the indoor condenser to heat an interior;

some of the compressed refrigerant to radiate heat while passing through the chiller for the battery to increase a temperature of the cooling water for the battery, to absorb heat from the cooling water for the electric component while passing through the chiller for the electric component, and then to be circulated to the compressor; and a remainder of the compressed refrigerant to be expanded while passing through the first expansion valve, to absorb heat while passing through the outdoor condenser, and then to be circulated to the compressor.

17. The thermal management system of claim 16, wherein, in the fifth heating mode, the controller is configured to:

operate the compressor and the refrigerant heater to allow the compressed refrigerant to be heated while passing through the refrigerant heater;

fully open the third expansion valve, partially open the fourth expansion valve, and operate the water pump for the battery and the water pump for the electric component to allow some of the refrigerant radiating heat while passing through the indoor condenser to increase the temperature of the cooling water for the battery, to be expanded while passing through the fourth expansion valve, and then to absorb heat from the cooling water for the electric component in the chiller for the electric component; and partially open the first expansion valve and fully open the second expansion valve to allow the remainder of the compressed refrigerant radiating heat while passing through the indoor condenser to be expanded while passing through the first expansion valve, and then to absorb heat from outdoor air while passing through the outdoor condenser.

* * * * *